(12) United States Patent
El Hafidi et al.

(10) Patent No.: US 7,298,685 B2
(45) Date of Patent: Nov. 20, 2007

(54) METHOD AND APPARATUS FOR RECORDING TO AND READING FROM A MULTI-LAYER DIFFRACTIVE OPTICS MEMORY

(75) Inventors: Idriss El Hafidi, Strasbourg (FR); Romualda Grzymala, Strasbourg (FR); Lhassan Elouad, Strasbourg (FR); Patrick Meyrueis, Strasbourg (FR)

(73) Assignee: Research Investment Network, Inc., Long Beach, CA (US)

( * ) Notice: Subject to any disclaimer, the term of this patent is extended or adjusted under 35 U.S.C. 154(b) by 94 days.

(21) Appl. No.: 10/512,288

(22) PCT Filed: May 2, 2002

(86) PCT No.: PCT/EP02/05457

§ 371 (c)(1),
(2), (4) Date: Oct. 25, 2004

(87) PCT Pub. No.: WO03/094157

PCT Pub. Date: Nov. 13, 2003

(65) Prior Publication Data

US 2005/0168856 A1    Aug. 4, 2005

(51) Int. Cl.
*G11B 7/00* (2006.01)
(52) U.S. Cl. .............. 369/103; 359/32; 359/7
(58) Field of Classification Search ............ 359/883, 359/32, 7; 369/103
See application file for complete search history.

(56) References Cited

U.S. PATENT DOCUMENTS 3,560,072 A    2/1971  Silverman et al.
4,265,522 A *  5/1981  Matsumoto et al. ........ 396/288
4,592,618 A *  6/1986  Huignard et al. .............. 359/7
5,005,927 A *  4/1991  Cudney et al. ................ 359/7
5,121,231 A *  6/1992  Jenkins et al. ................ 359/7
5,282,067 A *  1/1994  Liu ............................... 359/4
5,331,445 A *  7/1994  Dickson et al. .............. 359/15
5,470,690 A   11/1995  Lewis et al.
5,606,433 A    2/1997  Yin et al.
5,696,613 A * 12/1997  Redfield et al. .............. 359/32
6,023,355 A *  2/2000  Bashaw et al. ............... 359/32
6,088,321 A *  7/2000  Yamaji et al. ............. 369/103
6,646,771 B2* 11/2003  Stevenson ..................... 359/2
6,943,950 B2*  9/2005  Lee et al. .................... 359/571

FOREIGN PATENT DOCUMENTS

EP          1065658 A1    3/2001
WO          0030084 A1    5/2000
WO     WO 00/30084    *   5/2000

* cited by examiner

*Primary Examiner*—Wayne Young
*Assistant Examiner*—Van T. Pham
(74) *Attorney, Agent, or Firm*—Steve A. Wong; Caroline T. Do

(57) ABSTRACT

The present invention comprises an apparatus and method for recording information on a multi-layer diffractive optics memory to extend storage capacity. A composite mirror device comprises a plurality of sets of mirror elements. Each one of the mirror elements of the sets is configured to direct a reference beam to a point of the multi-layer memory at one of a plurality of angles. A plurality of planes is associated with the plurality of sets. There is one plane per set, each plane being defined for each of the sets of mirror elements so that the paths formed from the mirror elements of the set to the point lie in the plane. Each of the planes is separated from its neighbor by an angle selected to avoid crosstalk.

20 Claims, 5 Drawing Sheets

METHOD AND APPARATUS FOR RECORDING TO AND READING FROM A MULTI-LAYER DIFFRACTIVE OPTICS MEMORY

CROSS-REFERENCE TO RELATED APPLICATIONS

This Application relates to the applications entitled: PHOTONICS DATA STORAGE SYSTEM USING A POLYPEPTIDE MATERIAL AND METHOD FOR MAKING SAME (PCT/FR01/02386) filed on Jul. 20, 2001.

FIELD OF INVENTION

The present invention generally relates to a large volume diffractive optics memory. In particular, the present invention relates to an apparatus and method for recording information to and reading information from a multi-layer diffractive optics memory. Furthermore, the present invention relates to methods for making a multi-layer memory.

BACKGROUND OF THE INVENTION

The large storage capacities and relative low costs of CD-ROMS and DVDs have created an even greater demand for still larger and cheaper optical storage media. Holographic memories have been proposed to supersede the optical disc as a high-capacity digital storage medium. The high density and speed of the holographic memory comes from three-dimensional recording and from the simultaneous readout of an entire packet of data at one time. The principal advantages of holographic memory are a higher information density ($10^{11}$ bits or more per square centimeter), a short random access time (~100 microseconds and less), and a high information transmission rate ($10^9$ bit/sec).

In holographic recording, a light beam from a coherent monochromatic or multi-spectral source (e.g., a laser) is split into a reference beam and an object beam. The object beam is passed through a spatial light modulator (SLM) and then into a storage medium. The SLM forms a matrix of shutters (in the binary case) or, more generally, a matrix of photocells modulating the light intensity that represents a packet of data. The object beam passes through the SLM which acts to modulate the object beam with the binary information being displayed on the SLM. The modulated object beam is then directed to one point on the storage medium by a beam processor where it intersects with the reference beam to create a hologram representing the packet of data.

An optical system consisting of lenses and mirrors is used to precisely direct the optical beam encoded with the packet of data to the particular spatially addressed area of the storage medium. Optimum use of the capacity of a thick storage medium is realized by spatial and angular multiplexing. In spatial multiplexing, a set of packets is stored in the storage medium shaped into a plane as an array of spatially separated and regularly arranged sub-holograms by varying the beam target in the x-axis and y-axis of the plane. Each sub-hologram is formed at a point in the storage medium with the rectangular coordinates representing the respective packet address as recorded in the storage medium. In angular multiplexing, recording is carried out by keeping the x- and y-coordinates the same while changing the irradiation angle of the reference beam in the storage medium. By repeatedly incrementing the irradiation angle, a plurality of packets of information is recorded as a set of sub-holograms at the same x- and y-spatial location.

Previous techniques for recording information to a highly multiplexed volume holographic memory, and for subsequently reading the information from this memory are limited in memory capacity.

It is therefore an object of the present invention to provide an apparatus for recording to and reading from a multi-layer diffractive optics memory capable of an extended storage capacity.

It is a further object of the present invention to increase the capacity of the multi-layer diffractive optics memory by developing hyper-multiplexing techniques.

It is another object of the present invention to develop a hyper-multiplexing recording device for recording information to a multi-layer diffractive optics memory which has a small size.

It is still another object of the present invention to develop a hyper-multiplexing reading device which reads information from a multi-layer diffractive optics memory which has a small size.

It is yet a further object of the present invention to develop methods for making a multi-layer diffractive optics memory.

Further objects and advantages of the present invention will become apparent from a consideration of the drawings and ensuing description.

SUMMARY OF THE INVENTION

In order to achieve the above-mentioned objectives, the present invention comprises an apparatus and method for recording information on a multi-layer diffractive optics memory. A composite mirror device comprises a plurality of sets of mirror elements. Each one of the mirror elements of the sets is configured to direct a reference beam to a point of the multi-layer memory at one of a plurality of angles. A plurality of planes is associated with each of the plurality of sets. There is one plane per set, each plane being defined for each of the sets of mirror elements so that the paths formed from the mirror elements of the set to the point lie in the plane. Each of the planes is separated from its neighbor by an angle selected to avoid crosstalk.

In a further aspect of the present invention, the multi-layer diffractive optics memory comprises a plurality of layers of recording material.

In still another aspect of the present invention, an object beam records information at the point of the memory extending through the memory.

In yet another aspect of the present invention, the reference beam is configured to interfere with the object beam in the memory throughout the point.

In another aspect of the present invention, an angular processing mirror positions the reference beam to one of the mirror elements which then directs the reference beam to the point.

In still another aspect of the present invention, the mirror elements of each of the sets of mirror elements implements angular multiplexing by forming the plurality of angles for the set.

In another aspect of the present invention, the memory is made of a polypeptide material.

In still another aspect of the present invention, the memory comprises eight layers.

In another aspect of the present invention, each of the sets has 50 mirror elements.

In yet another aspect of the present invention, the composite mirror device comprises 50 sets of mirror elements implementing 50 planes.

In still another aspect of the present invention, the memory is moved in an -x or -y direction of the rectilinear coordinates of the surface of the memory so that the reference beam shifts with respect to the surface of the memory so that the point shifts to another spatial location on the surface of the medium whereby spatial multiplexing is implemented.

In another aspect of the present invention, the present invention comprises an apparatus and method for reading information from a multi-layer diffractive optics memory. A composite mirror device comprises a plurality of sets of mirror elements. Each one of the mirror elements of the sets is configured to direct a reference beam to a point of the multi-layer memory at one of a plurality of angles. A plurality of planes is associated with the plurality of sets. There is one plane per set, each plane being defined for each of the sets of mirror elements so that the paths formed from the mirror elements of the set to the point lie in the plane. Each of the planes is separated from its neighbor by an angle selected to avoid crosstalk.

In still another aspect, the present invention comprises the multi-layer diffractive optics memory.

In another aspect of the present invention, the memory is composed of polypeptide material.

In yet another aspect of the present invention, an angular processing mirror positions the reference beam to the point of the memory.

In another aspect of the present invention, the angular processing mirror is a MEOMS.

In still another aspect of the present invention, a plurality of light-sensitive elements detects a reconstruction beam carrying a packet of information at the point illuminated with the reference beam.

In another aspect of the present invention, the plurality of light-sensitive elements forms a CCD camera.

In still another aspect of the present invention, there is a method for making a multi-layer diffractive optics memory on a glass substrate. A first layer of the memory is made by laying down a thin layer of polypeptide on a glass substrate. One or more interference patterns is recorded in the first layer. A thin layer of optical glue is laid down for protection over the first layer. A second layer is made by laying down a thin layer of polypeptide onto the previously constructed first layer and protection layer. One or more interference patterns is recorded in the second layer.

In still another aspect of the present invention, the steps of making a layer and recording a layer to build additional layers onto the glass substrate are repeated until a desired number of the layers are constructed.

The present invention further comprises a method for making a multi-layer diffractive optics memory on a plastic film substrate. This method comprises coating a layer of polypeptide on the film substrate comprising a plurality of sectors, sequentially recording packets of information on each of the sectors at a different plane of multiplexing angles for each of the sectors, cutting the film substrate into the sectors, and superposing the sectors on top of each other to form the multi-layer memory.

DETAILED DESCRIPTION OF THE INVENTION

Recording Process

Figure 1:
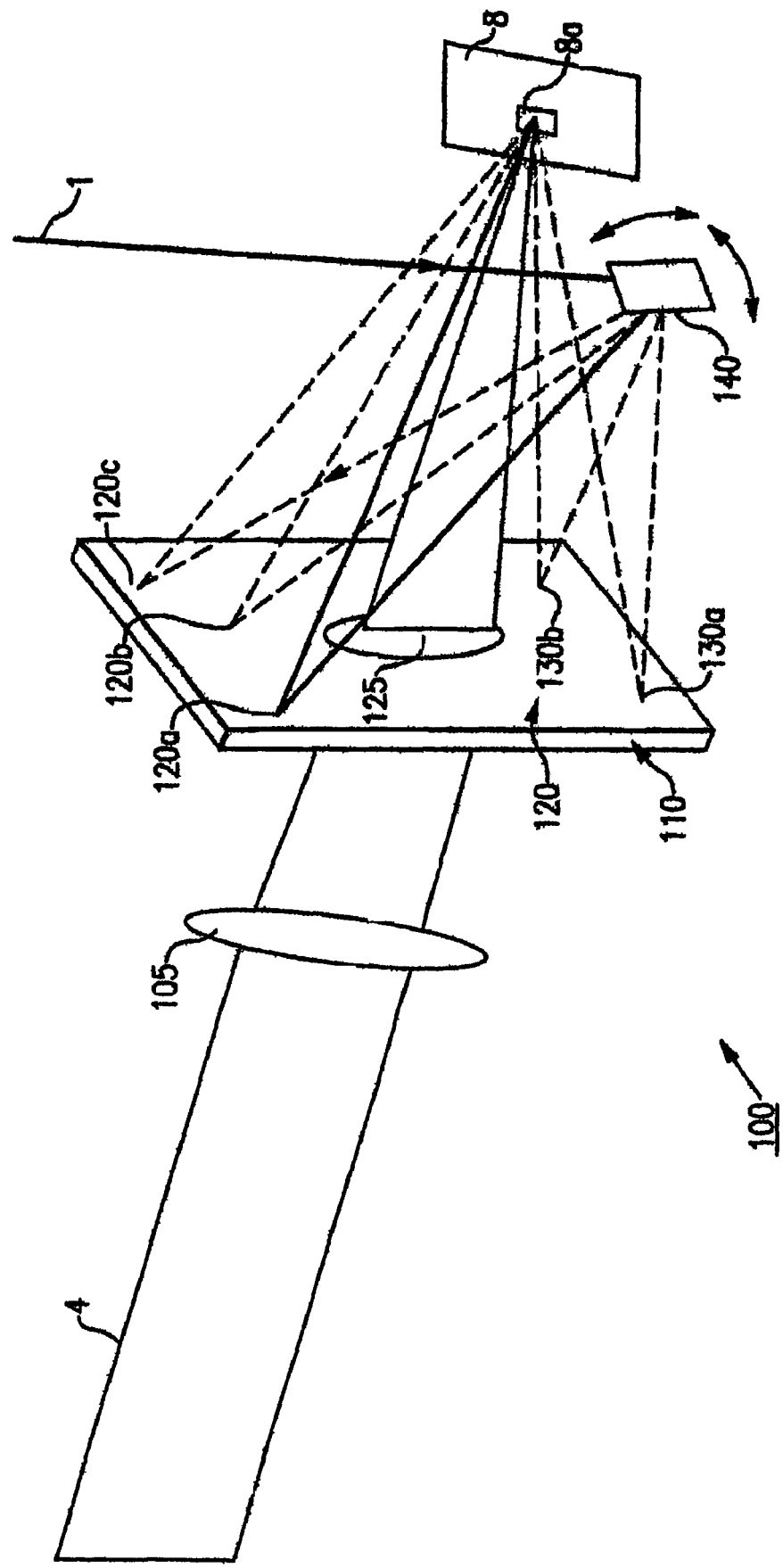
FIG. 1 shows an apparatus for recording information on a multi-layer diffractive optics memory according to the present invention.

FIG. 1 shows an apparatus 100 for recording information at a point 8a of a multi-layer diffractive optics memory 8 according to the present invention. A laser (not shown) emits a coherent light beam which is divided by a beam splitter (not shown) into a reference beam 1 and an object beam 4. The reference beam 1 is directed by an angular processing mirror 140 to one of the mirror elements 120 of the composite mirror device 110 which then aims the reference beam 1 onto one of the points 8a of the multi-layer diffractive optics memory 8. The object beam 4 is focused by a focusing lens 105 through a hole 125 in the composite mirror device 110 onto the point 8a where the object beam 4 interferes with the reference beam 1 creating a holographic interference pattern within the material of the diffractive optics memory 8.

The multi-layer diffractive optics memory 8 is alternately referred to as a storage medium. The multi-layer diffractive optics memory 8 comprises a polypeptide material capable of storing information coated onto a recording plate. At the end of a recording process, the multi-layer diffractive optics memory 8 stores information therein. Two methods of creating a multi-layer diffractive optics memory will be described below.

Figure 2:
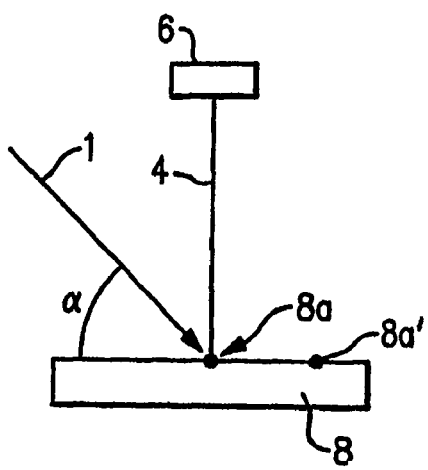
FIG. 2 is a schematic representation of an apparatus for recording an interference pattern in a multi-layer diffractive optics memory according to the present invention.

The object beam 4 is modulated by a display (not shown) with a packet of information 6 (see FIG. 2). The display (not shown) may be any display for displaying a data packet 6 in two dimensions such as a spatial light modulator (SLM) or a liquid crystal light valve (LCLV). The display comprises, for example, a liquid crystal display screen on which data is encoded in a two-dimensional pattern of transparent and opaque pixels. The data is input to the display via a computer (not shown) or by other digital data or analog origins. The plurality of bits represented on the display screen of the display as a two-dimensional pattern of transparent and opaque pixels is known as a data packet 6 (see FIG. 2). The data packed 6 displayed is derived from any source such as a computer program, the Internet, and so forth. In an Internet storage application, the packets displayed may be formatted similarly to the packets of the Internet. The object beam 4 becomes modulated by the information to be recorded by means of transmission through the display.

The lasers, beam splitter and SLM devices for holographic recording have been developed in the art and further details can be found in the book *Holographic Data Storage*, Springer (2000) edited by H. J. Coufal, D. Psaltis, and G. T. Sincerbox.

At the same time, the reference beam 1 undergoes reflection off the angular processing mirror 140 which can rotate so that the reference beam 1 arrives at one of the micro-mirrors 120 which are organized into sets of the composite mirror device 110 the orientation of which will modify the angle of incidence of the reference beam 1 with respect to the object beam 4, again in the region of the diffractive optics memory 8. Thus, by this process angular multiplexing is implemented.

The angular processing mirror 140 has stability characteristics fitting the constraints of recording. The angular processing mirror 140 sends the reference beam 1 to the composite mirror device 110. The composite mirror device 110 comprises a plurality of mirror elements 120 spatially organized into rows and columns forming sets. Each of the mirror elements 120 has a specific spatial angular orientation. In one embodiment of the present invention, in every set (e.g., this could be a row) there are 50 mirrors to deflect the reference beam 1 at one of 50 angles and there are 50 rows of mirrors, one row for each of 50 planes of the mirror. Every set is oriented in a different way in order to process the beam to a different plane. In this embodiment, each point has 2500 packets of information stored therein (50 angles for each of 50 sets of mirror elements). Furthermore, a packet has a size of 800×600 bytes stored at a point 1 mm². Thus the storage capacity is one terabits per centimeter squared.

FIG. 2 shows a schematic of the important signals involved in recording a diffraction pattern, or alternately a hologram, in the diffractive optics memory 8 using angular and spatial multiplexing. Various diffractive recording processes have been developed in the art and further details can be found in the book *Holographic Data Storage*, Springer (2000) edited by H. J. Coufal, D. Psaltis, and G. T. Sincerbox. In forming a hologram, the reference beam 1 intersects with the object beam 4 to form a sub-hologram 8a (referred to alternately as a point) extending through the volume of storage medium 8. There is a separate sub-hologram or point 8a extending through the volume for each angle and spatial location of the reference beam 1. The object beam 4 is modulated with a packet of information 6. The packet 6 contains information in the form of a plurality of bits. The source of the information for the packet 6 can be a computer, the Internet, or any other information-producing source. The hologram impinges on the surface 8a of the storage medium 8 and extends through the volume of the storage medium 8. The information for the packet 6 is modulated onto the storage medium 8 by spatial multiplexing and angle multiplexing. Angle multiplexing is achieved by varying the angle $\alpha$ of the reference beam 1 with respect to the surface plane of the storage medium 8. A separate packet 6 of information is recorded in the storage medium 8 as a sub-hologram for each chosen angle $\alpha$ and spatial location. Spatial multiplexing is achieved by shifting the reference beam 1 with respect to the surface of the storage medium 8 so that the point 8a shifts to another spatial location, for example point 8a', on the surface of the storage medium 8. One embodiment for shifting the reference beam is to mechanically move the memory 8 in a -x or -y direction with respect to the reference beam.

The storage medium 8 is typically a three-dimensional body made up of a material sensitive to a spatial distribution of light energy produced by interference of the object light beam 4 and the reference light beam 1. A hologram may be recorded in a medium as a variation of absorption or phase or both. The storage material must respond to incident light patterns causing a change in its optical properties. In a volume hologram, a large number of packets of data can be superimposed, so that every packet of data can be reconstructed without distortion. A volume (thick) hologram may be regarded as a superposition of three dimensional gratings recorded in the depth of the emulsion each satisfying the Bragg law (i.e., a volume phase grating). The grating planes in a volume hologram produce change in refraction and/or absorption.

Several materials have been considered as storage material for optical storage systems because of inherent advantages. These advantages include a self-developing capability, dry processing, good stability, thick emulsion, high sensitivity, and nonvolatile storage. Some materials that have been considered for volume holograms are photofractive crystals, photopolymer materials, and polypeptide material.

The diffractive optics memory 8 may be made of photopolymer materials, polypeptide material, and other such materials for optical recording. With a photopolymer the density storage will be much more limited than by using a polypeptide with a shorter life duration and a lower SNR and a lower tolerancing. Polypeptides are the only photo-material allowing stability, transparency to substantially all wavelengths, large diffraction efficiency, an angular tolerancing that can be programmed and controlled, and a very good stability over a large range of temperatures. Polypeptide can be protected against ultra-violet light, moisture, scratches and other physical constraints. Thus, preferably, the diffractive optics memory 8 is made of a polypeptide material.

An embodiment of a polypeptide material suitable for the diffractive optics memory 8 is disclosed in the application PHOTONICS DATA STORAGE SYSTEM USING A POLYPEPTIDE MATERIAL AND METHOD FOR MAKING SAME (PCT/FR01/02386) filed on Jul. 20, 2001 and incorporated herein.

Figure 3:
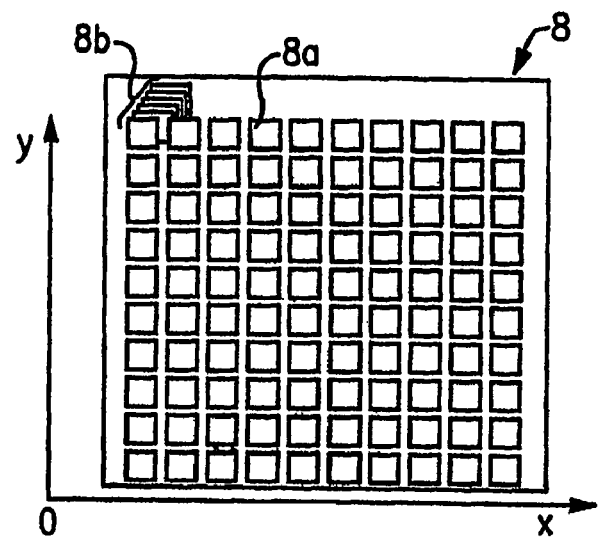
FIG. 3 is a schematic representation of a matrix of points formed on a multi-layer diffractive optics memory according to the present invention.

FIG. 3 shows in greater detail the diffractive optics memory 8 arranged in the form of a flat sheet, herein referred to as a matrix. In this example, the matrix is 1 cm². Each of a plurality of points on the matrix is defined by its rectilinear coordinates (x, y). An image-forming system (not shown) reduces the object beam 4 to the sub-hologram 8a having a minimum size at one of the x, y points of the matrix. A point in physical space defined by its rectilinear coordinates contains a plurality of packets 8b.

In this case, a 1 mm² image 8a is obtained by focusing the object beam 4 onto the storage medium 8 centered at its coordinate. Due to this interference between the two beams 1,4, a diffractive image 8a 1 mm² in size is recorded in the storage medium 8 centered at the coordinates of the matrix. Spatial multiplexing is carried out by sequentially changing the rectilinear coordinates. The object beam 4 focuses on the storage medium 8 so that a separate image 8a is recorded at a unique position in the plane defined by its coordinates (x, y). This spatial multiplexing results in a 10 by 10 matrix of points (i.e. diffractive images) 8a. Angle multiplexing is carried out by sequentially changing the angle of the reference beam 1 by means of the composite mirror device 110 as described above. Angle multiplexing is used to create 25 packets of information 8b corresponding to 25 discrete variations of the angle of incidence of the reference beam. Experimental results show that 25 multiplexing angles are possible and this can be doubled, by a symmetric set-up to 50 angles. A data packet is reconstructed by shinning the reference beam 1 at the same angle and spatial location in which the data packed was recorded. The diffractive portion of the reference beam 1 diffracted by the storage medium 8 forms the reconstruction, which is typically detected by a detector array. The storage medium 8 may be mechanically shifted in order to store data packets at different points by its coordinates (x, y).

Figure 4A:
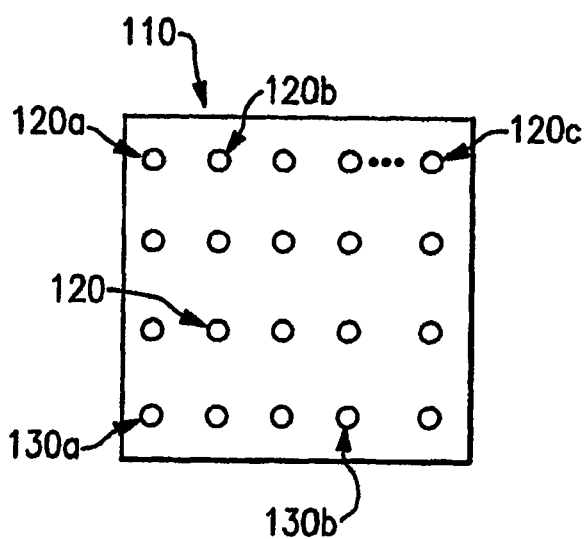
FIG. 4a shows a composite mirror device comprising a plurality of micro-mirrors organized into sets according to the present invention.

FIG. 4a shows the composite mirror device 110 comprising a plurality of micro-mirrors organized into sets. A micro-mirror 120 illustrates an instance of a micro-mirror. FIG. 4a shows a typical example of the organization of the micro-mirrors 120, including a first set of flat micro-mirrors including in a row of the composite mirror device 110 instances 120a, 120b, 120c, and a second set of micro-mirrors, including in another row of the composite mirror device 110 instances 130a, 130b. Each of the micro-mirrors 120 has a specific orientation depending on its purpose (implemented function). The composite mirror 110 has a hole 125 in its center to allow the object beam 4 to cross through for the recording process. The hole 125 is not necessary for the subsequent reading process (see FIG. 8).

Figure 4B:
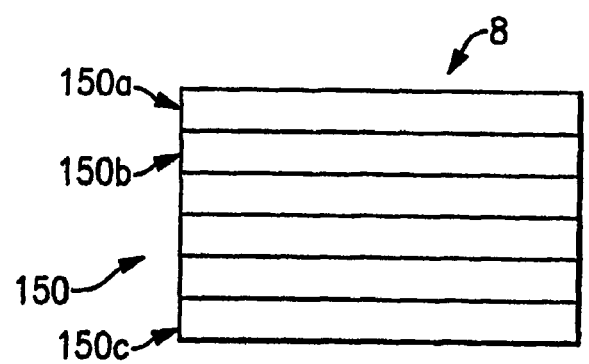
FIG. 4b shows a multi-layer diffractive optics memory according to the present invention.

FIG. 4b shows a cross-section of the multi-layer diffractive optics memory 8 having a plurality of layers 150, two of which are labeled 150a and 150b. In one of the embodiments of the present invention, there are 8 layers. A layer is coated on the surface of a glass or plastic substrate 150c. Each of the layers has a thickness of 30 microns of specially sensitized polypeptide material. On a single layer a maximum of 350 packets can be recorded. A memory with 8 layers allows for the storage of 2,500 packets of information (i.e. 2500 divided by 350 equals 8 rounded up).

Figure 4C:
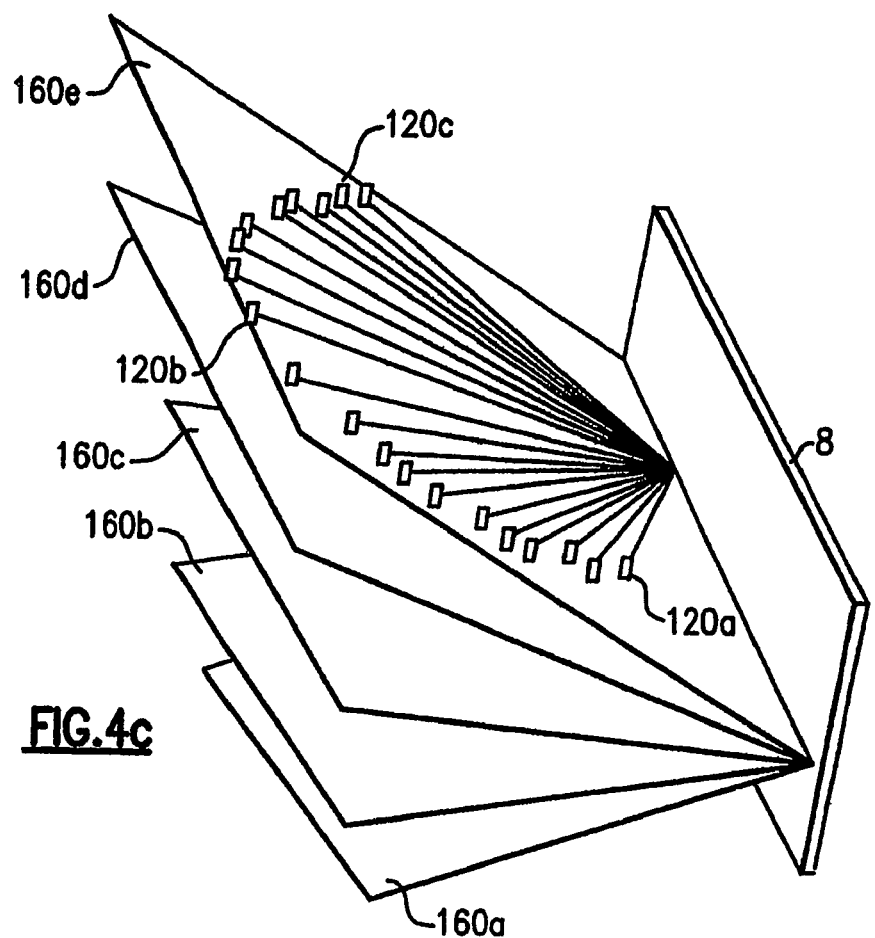
FIG. 4c illustrates the principal of recording using a plurality of planes on a multi-layer diffractive optics memory according to the present invention.

FIG. 4c illustrates the principal of recording using a plurality of planes 160. The multi-layer diffractive optics memory 8 is formed by coating a plurality of layers of polypeptide material on the plate substrate, e.g., glass or plastic. There is illustrate in FIG. 4c a plurality of planes 160 (e.g., 160a-160e). The set of mirrors with instances 120a, . . . , 120c is organized such that reference beams formed extending from the mirrors 120 to a single point 8a of the recording plate 8 all lie in the same plane. For example, the mirrors 120a, . . . 120c form reference beams which are all in the same plane 160e. Each set of micro-mirrors lie in a different plane. All the micro mirror from a set of micro-mirrors are located (their central perpendicular axis) in the same plane and all the reference beams are routed to the same point in the recording material.

Several planes, including mirror axis, are located at different angles. This is to say that these planes share one straight line, and, that between each of these planes there is a determined angular value (see FIG. 4c). So every plane incorporates its own set of axis of micro-mirrors all these mirrors are thus routing the reference beams toward the same point.

The number of these planes has a maximum value of 50 which has been experimentally checked to avoid cross talk. In one embodiment of the present invention, each plane comprises 50 micro-mirrors. The result of having 50 mirrors in 50 planes is 50×50=2500 pages (packets) recorded on the same point of the recording plate. These numbers may be increased and only depend on the multiplexing capability of the recording material.

Figure 5:
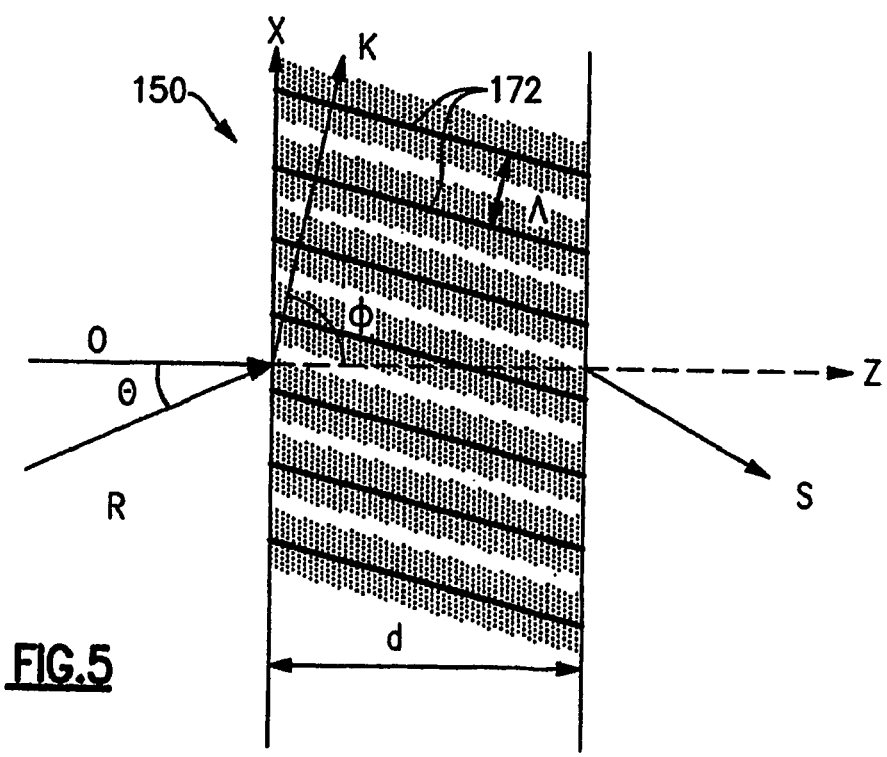
FIG. 5 shows a layer of the multi-layer diffractive optics memory having fringes produced by two interfering plane waves according to the present invention.

FIG. 5 shows a cross-sectional drawing one of the layers 150 of the multi-layer diffractive optics memory 8 according to the present invention. The layer 150 of the recording material is mainly characterized by the modulation index given by the formula:

$$\Delta n = \left(\frac{\lambda \cos(\theta)}{\pi d}\right) \arcsin \sqrt{\eta}$$

where $\Delta n$ is the refraction index modulation,
where $\eta$ is the diffraction efficiency of the recording material,
where $\theta$ is the angle between the reference beam and the object beam,
where d is the thickness of the layer, and
where $\lambda$ is the wavelength.

FIG. 5 illustrates the vectors of the layer:
where R is the vector of the reference beam propagation,
where O is the vector of the object beam propagation,
where K is the vector of the grating realized by the interference pattern,
where $\Phi$ is the angle between the grating vector and an axis which is parallel to the optical axis beam,
where S is the mathematical representation of the combination of vector O and R, and
where Z is the vector normal to the layer.

The lines 172 inside the layer 150 represent the pattern of interference in the case of interference of the two plane wavefronts O and R. This pattern is recorded in a polypeptide material sensitized for the appropriate wavelength. Once recorded this interference pattern becomes a diffractive pattern. The interfringe spacing in this simplified case is constant. The constant fringe spacing results (but only in this case) from the shape of the wavefronts (i.e., plane wavefronts) of the two interfering beams, one being the reference beam, the other one being the object beam. FIG. 5 represents the simulation of the grating characteristic related to the object and reference beam, i.e., incident angles and parameters characteristic of the material, such as the thickness of the material and refractive index. The simulation is based on the Kogelnick model. FIG. 5 provides an overview of the polypeptide recording material and illustrates a simple case for better understanding. But in the general case, the shape of the fringes are much more complex because they are modulated by the data.

Methods for Making a Multi-Layer Memory

A multi-layer memory is composed of several superposed layers glued to each other. Preferably, every layer is composed of polypeptide material. Between every layer there is an interface containing glue. The multi-layering process is different depending on whether it uses glass or plastic as the substrate.

Figure 6:
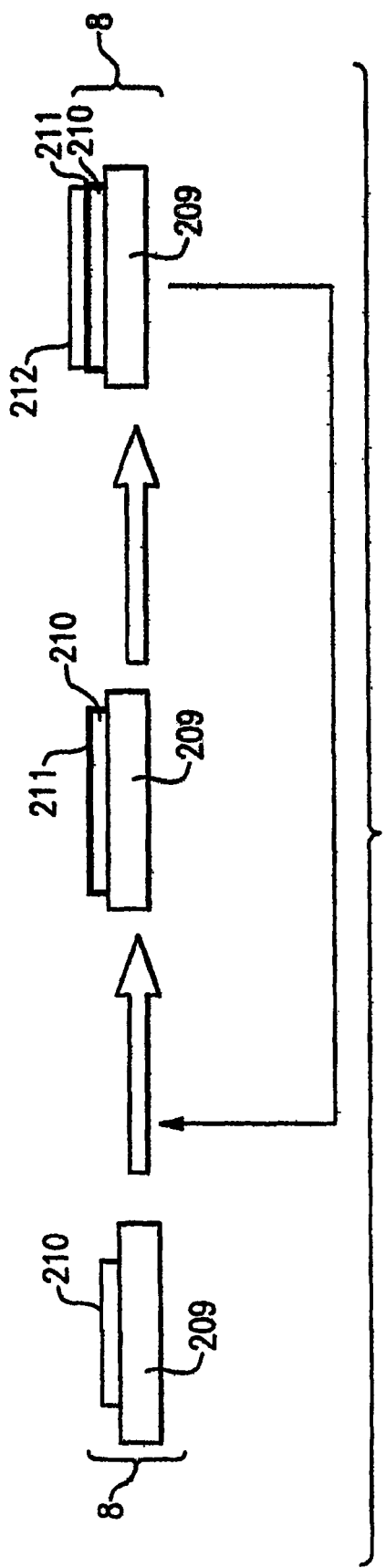
FIG. 6 shows an embodiment of a method for making a multi-layer diffractive optics memory according to the present invention.

FIG. 6 shows an embodiment of a process of making a multi-layer diffractive optics memory 8 using a glass substrate 209. A thin polypeptide layer 210 is added on top of the glass substrate 209. Then, a recording is made on the layer 210 in a point matrix form (see FIG. 3) using angular multiplexing. Then a thin layer 211 of optical glue is applied for protection. Afterwards, a second layer 212 is layered on the thin layer 211 with an adapted coating machine to reach a satisfying uniformity. The process is repeated until the desired number of layers containing recordings are created. This method is slow and not completely automated.

Figure 7:
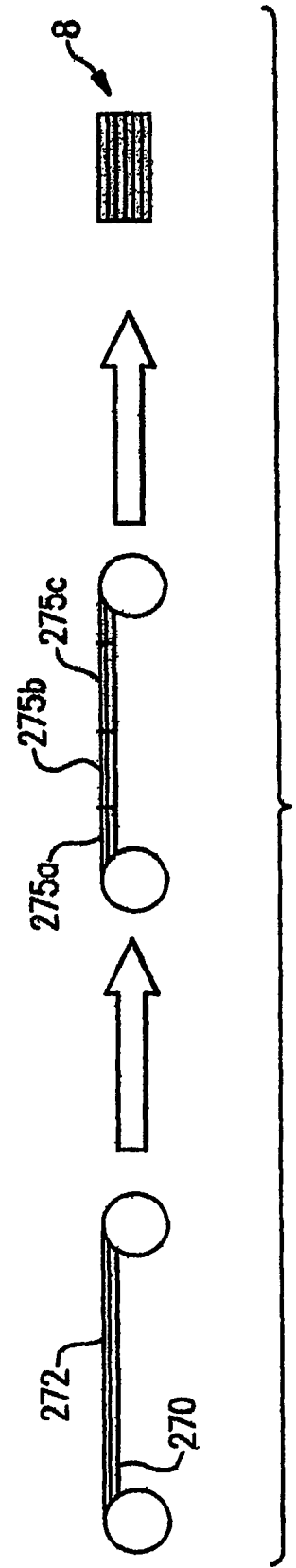
FIG. 7 shows another embodiment for a method for making a multi-layer diffractive optics memory according to the present invention.

FIG. 7 shows an embodiment of a process of making a multi-layer diffractive optics memory 8 on a plastic film substrate 270. First, there is a polypeptide layer coating 272 applied on the film substrate 270. Then, there is sequential recording of consecutive sectors using different planes of multiplexing angles. The recording film 272 is cut into a plurality of sectors 275, for example, sectors 275a, 275b, 275c are shown Then the sectors 275a-275c are ordered, followed by the step of superposition and the step of protection. First, a polypeptide layer is coated on the film. Each of the sectors 275 is a portion of the recording film 272 in which a 10×10 points matrix is recorded (on 1 cm×1 cm). Each of the consecutive sectors 275 are recorded sequentially. During the recording of a sector, the sector before that recorded sector and the sector after that recorded sector are light protected. After recording of the complete roll of film, the film is processed with the processing method enclosed in the application PHOTONICS DATA STORAGE SYSTEM USING A POLYPEPTIDE MATERIAL AND METHOD FOR MAKING SAME (PCT/FR01/02386) filed on Jul. 20, 2001 and incorporated herein.

Then, a second film is recorded and processed the same way. Then all the films are glued with an optical film glue so that the sectors are matched. The matching is done within an accuracy of 10 microns. An alternative method for making the multi-layer memory consists in cutting physically every sector and then superposing the cut sectors with an appropriate protection layer.

In one particular embodiment of the present invention, the steps for placing recording material on a plastic substrate 270 are as follows.

In step 1, the plastic substrate 270 is coated with a polypeptide material 272 to form a film.

In step 2, the sequential sectors 275 are recorded using the matrix multiplex recording process.

In step 3, there is a recording of one or more films, each film including one layer.

In step 4, eight films are processed including the recorded sectors.

In step 5, after recording and processing of the eight films, superposition is carried out with the assistance of a classical micro positioning machine with appropriate optical film glue in such a way that on every sector there are eight superposed layers.

In an alternative embodiment, after step 1 and step 2, the following alternate steps are proceed through.

In alternative step 3, one layer of polypeptide is recorded on the plastic substrate. The recording is done sector by sector (sequentially).

In alternative step 4, after recording of the roll of film, the film is processed with the processing method enclosed in the application PHOTONICS DATA STORAGE SYSTEM USING A POLYPEPTIDE MATERIAL AND METHOD FOR MAKING SAME (PCT/FR01/02386) filed on Jul. 20, 2001 and incorporated herein. This process is a wet chemical process using a sequence of baths.

In alternative step 5, the film is cut sector by sector at the limit of the outskirts of ever sector.

In alternative step 6, superposition of the layers is achieved with a 10 microns accuracy of every sector (eight layers) sector by sector. Between two of the film sectors a specific glue is used.

Reading Process

Figure 8:
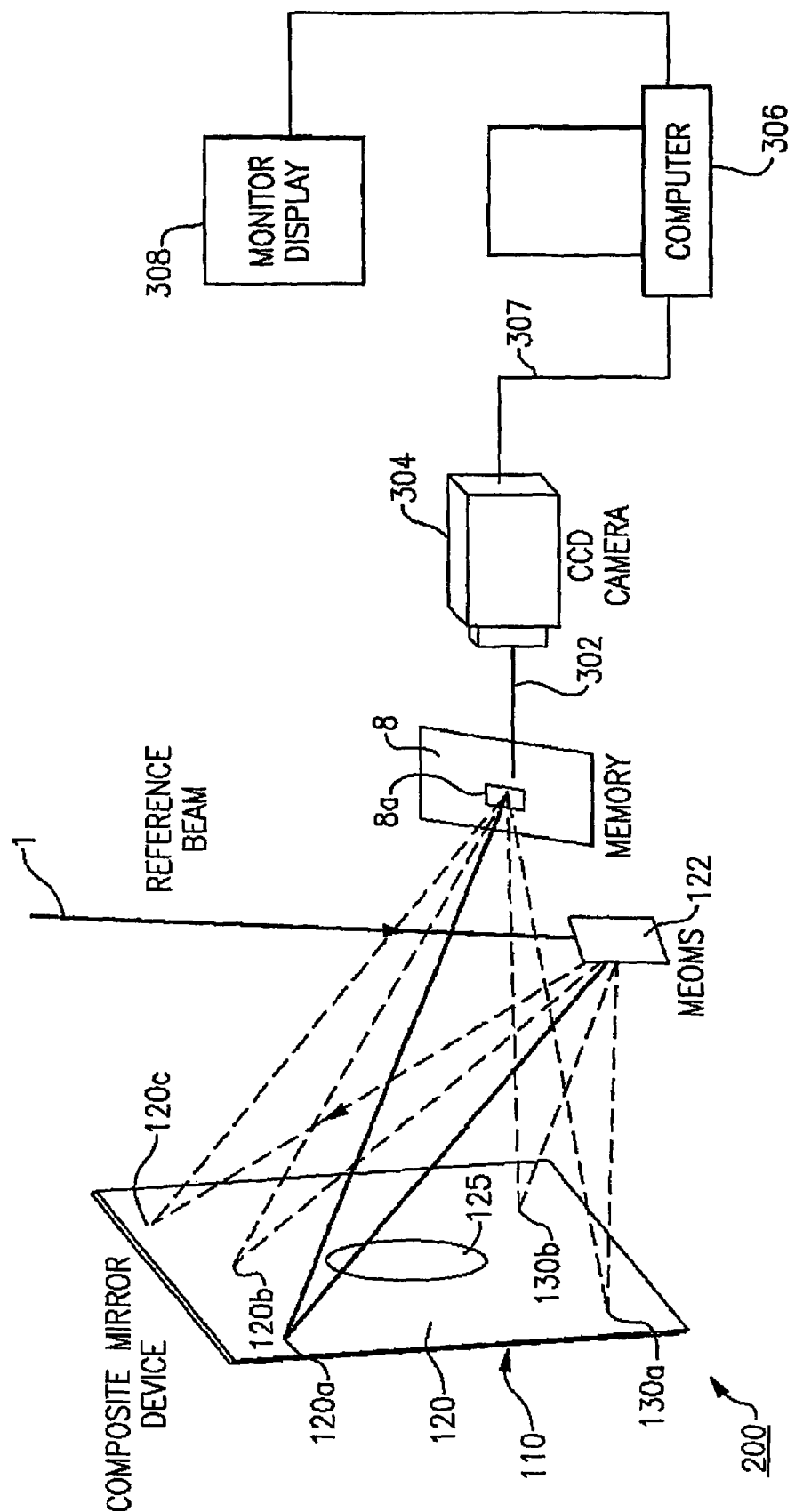
FIG. 8 shows an apparatus for reading information from a multi-layer diffractive optics memory according to the present invention.

FIG. 8 shows an apparatus 200 for reading information from a multi-layer diffractive optics memory 8 according to the present invention. A laser (not shown) emits a reference beam 1. The reference beam 1 is directed by the MEOMS (Micro Opto Electro Mechanical System) 122 to one of the mirror elements 120 of the composite mirror device 110 which then aims the reference beam 1 onto one of the points 8a of the multi-layer diffractive optics memory 8. The reference beam 1 is aimed at the point 8a to create a reconstructed beam 302 at the point 8a which is recorded by a CCD (charge couple device) camera 304. The optical energy of the reconstruction beam 302 is converted by the CCD camera 304 to an electronic signal 307 carrying the information originally recorded which is subsequently interpreted by computer 306 and optionally displayed on monitor 308. The reading system 200 can be thus miniaturized with fast access. The size of the reader 200 is close to that of a cigarette box. The capacity that can be reached this way is around one terabit per square centimeter.

FIG. 8 shows the composite mirror device 110 comprising a plurality of micro-mirrors organized into sets. The micro-mirror 120 illustrates an instance of a micro-mirror. FIG. 8 shows a typical example of the organization of the micro-mirrors 120, including a first set of a plurality of flat micro-mirrors including in a row of the composite mirror device 110 (instances 120a, 120b, 120c are shown), and a second set of micro-mirrors, including in another row of the composite mirror device 110 (instances 130a, 130b are shown). Each of the micro-mirrors 120 has a specific orientation depending on its purpose (implemented function). The composite mirror 110 which had a hole 125 in its center to allow the object beam 4 to cross through for the recording process is not necessary for the subsequent reading process.

Spatial multiplexing is achieved by shifting the reference beam 1 with respect to the surface of the storage medium 8 so that the point 8a shifts to another spatial location, for example point 8a', (see FIG. 2) on the surface of the storage medium 8. In one embodiment, spatial multiplexing is realized by mechanically shifting the memory 8 in an -x and -y direction with respect to the matrix of the memory 8 (see FIG. 3).

The present invention is not to be limited in scope by the specific embodiments described herein. Indeed, this application is intended to cover modifications of the present invention, in addition to those described herein, and the present invention is not confined to the details which have been set forth. Thus, the scope of the invention should be determined by the appended claims and their legal equivalents, rather than by the examples given.

What is claimed is:

1. An apparatus for recording information on a multi-layer diffractive optics memory, comprising:
    a composite mirror device comprising a plurality of sets of mirror elements and a hole, each one of said mirror elements of said sets configured to direct a reference beam to a point of said multi-layer memory at one of a plurality of angles, a plurality of planes being associated with said plurality of sets, one plane per set, each plane being defined for each of said sets of mirror elements so that the paths formed from said mirror elements from said set to said point lie in said plane, each of said planes being separated from its neighbor by an angle selected to avoid crosstalk, an object beam being focused through said hole onto said point of said multi-layer.

2. The apparatus of claim 1, wherein said multi-layer diffractive optics memory comprises a plurality of layers of recording material.

3. The apparatus of claim 1, where said object beam which records information at said point of said memory extending through said memory.

4. The apparatus of claim 3, wherein said reference beam configured to interfere with said object beam in said memory throughout said point.

5. The apparatus of claim 1, further comprising:
an angular processing mirror for positioning said reference beam to one of said mirror elements which then directs said reference beam to said point.

6. The apparatus of claim 1, wherein said mirror elements of each of said sets of mirror elements implements angular multiplexing by forming said plurality of angles for said set.

7. The apparatus of claim 1, wherein said memory is made of a polypeptide material.

8. The apparatus of claim 1, wherein said memory comprises eight layers.

9. The apparatus of claim 1, wherein each of said sets has 50 mirror elements.

10. The apparatus of claim 1, wherein said composite mirror device comprises 50 sets of mirror elements implementing 50 planes.

11. The apparatus of claim 1, wherein said memory is moved in an -x or -y direction of rectilinear coordinates so that said reference beam shifts with respect to the surface of said memory so that said point shifts to another spatial location on the surface of said medium whereby spatial multiplexing is implemented.

12. An apparatus for recording information on a multi-layer diffractive optics memory, comprising:
a multi-layer diffractive optics memory comprising a plurality of layers of recording material;
an object beam which records information at a point of said memory;
a reference beam for interfering with said object beam in said memory throughout said point; and
a composite mirror device comprising a hole and a plurality of mirror elements, said mirror elements being organized into sets so that each one of said sets of mirror elements directs said reference beam at a range of angles, one mirror element per angle, to said point, and each said sets of said mirror elements forms a separate plane and wherein said object beam is focused through said hole onto said point of said multi-layer.

13. The apparatus of claim 12, further comprising:
an angular processing mirror for positioning said reference beam to one of said mirror elements which then directs said reference beam to said point.

14. The apparatus of claim 12, wherein said memory is made of a polypeptide material.

15. A hyper-multiplexing method for recording information on a multi-layer diffractive optics memory including a plurality of layers of recording material, said information being recorded at a plurality of planes, each of said planes separated from its neighbor by an angle selected to avoid crosstalk, comprising the steps of:
recording information from an object beam at a point of said memory extending through said layers of said memory;
interfering a reference beam with said object beam in said memory throughout said point; and
directing, with a composite mirror device comprising a hole and a plurality of mirror elements, said mirror elements being organized into sets of mirror elements, by each one of said mirror elements, said reference beam at one of a plurality of angles, one mirror element per angle, to said point at one of a plurality of planes, one set of said mirror elements implementing angle multiplexing for one of said planes and said object beam being focused through said hole onto said point of said multi-layer.

16. An apparatus for recording information from a multi-layer diffractive optics memory, comprising:
a composite mirror device comprising a hole and a plurality of sets of mirror elements, each one of said mirror elements of said sets configured to direct a reference beam to a point of said multi-layer memory at one of a plurality of angles, a plurality of planes being associated with said plurality of sets, one plane per set, each plane being defined for each of said sets of mirror elements so that the paths formed from said mirror elements from said set to said point lie in said plane, each of said planes being separated from its neighbor by an angle selected to avoid crosstalk, wherein said reference beam interferes with an objected beam to create a holographic pattern, said object beam being focused through said hole onto said point of said multi-layer.

17. The apparatus of claim 16, further comprising:
an angular processing mirror direct said reference beam to said composite mirror device.

18. The apparatus of claim 16, wherein said memory is composed of polypeptide material.

19. The apparatus of claim 17 wherein said composite mirror device aims said reference beam onto said point of said multi-layer.

20. The apparatus of claim 19, wherein said multi-layer is made of polypeptide material.

* * * * *